United States Patent [19]

Noble

[11] 4,216,730
[45] Aug. 12, 1980

[54] SIDE HILL BED SHAPER AND PLANTER

[76] Inventor: Billy M. Noble, P.O. Box 557, 100 Sunset Dr., Somerton, Ariz. 85350

[21] Appl. No.: 890,208

[22] Filed: Mar. 27, 1978

[51] Int. Cl.² .............................................. A01C 5/06
[52] U.S. Cl. ....................... 111/69; 111/52; 111/85; 111/DIG. 1; 172/161; 172/221
[58] Field of Search ............... 172/161, 701, 199, 162, 172/477, 176, 647, 219, 654, 221, 222, 223, 228, 735, 743; 111/1, DIG. 1, 63–65, 69, 85, 83, 33, 52

[56] References Cited

U.S. PATENT DOCUMENTS

| | | | |
|---|---|---|---|
| 807,700 | 12/1905 | Ulsh | 172/647 X |
| 1,001,955 | 8/1911 | Hodges | 172/654 X |
| 1,588,910 | 6/1926 | Ruby | 172/477 X |
| 2,401,837 | 6/1946 | Mellen et al. | 172/162 |
| 2,732,781 | 1/1956 | Coviello | 172/222 X |
| 2,939,538 | 6/1960 | Febre | 172/221 X |
| 2,975,842 | 3/1961 | Mostrong | 172/701 X |
| 3,139,941 | 7/1964 | Graham et al. | 111/33 X |
| 3,153,456 | 10/1964 | Noble | 172/161 |
| 3,200,778 | 8/1965 | Whelchel | 111/83 X |
| 3,200,891 | 8/1965 | Marron | 172/647 X |
| 3,456,607 | 7/1969 | West | 111/85 |

FOREIGN PATENT DOCUMENTS 778485  7/1957  United Kingdom .................. 111/85

*Primary Examiner*—Edgar S. Burr
*Assistant Examiner*—Steven A. Bratlie
*Attorney, Agent, or Firm*—Gregory J. Nelson

[57] ABSTRACT

A cottonseed planter for planting cottonseed along a selected side of a raised bed is disclosed. The planter is adapted for two-way operation through the field and includes a tool bar frame having ground engaging means. Multiple seeders are supported on the frame and at least one of the seeders is tiltable in both directions from vertical for seeding operations. Shaping blades are pivotally mounted on the frame intermediate the seeders and precede the seeders in operation. A control rod is operatively connected to the seeders and the blades so that upon reaching the end of a seed bed row, the operator can change the position of the seeders and blades and continue seeding on the same side of the seed bed in the reverse direction of operation through the field. In the preferred embodiment, the seeders are a press wheel type and at least one seeder is disengaged in each direction of operation.

7 Claims, 8 Drawing Figures

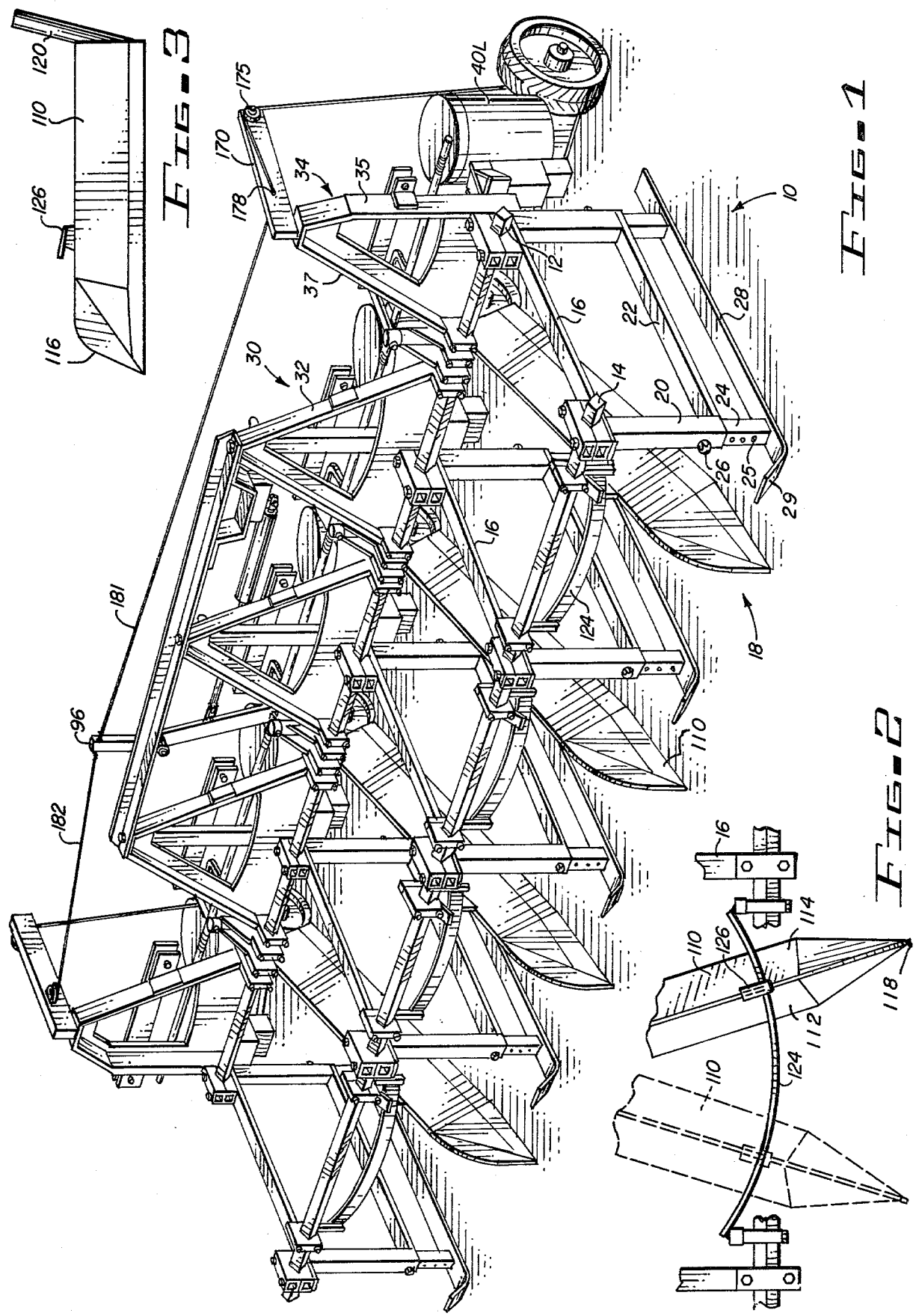

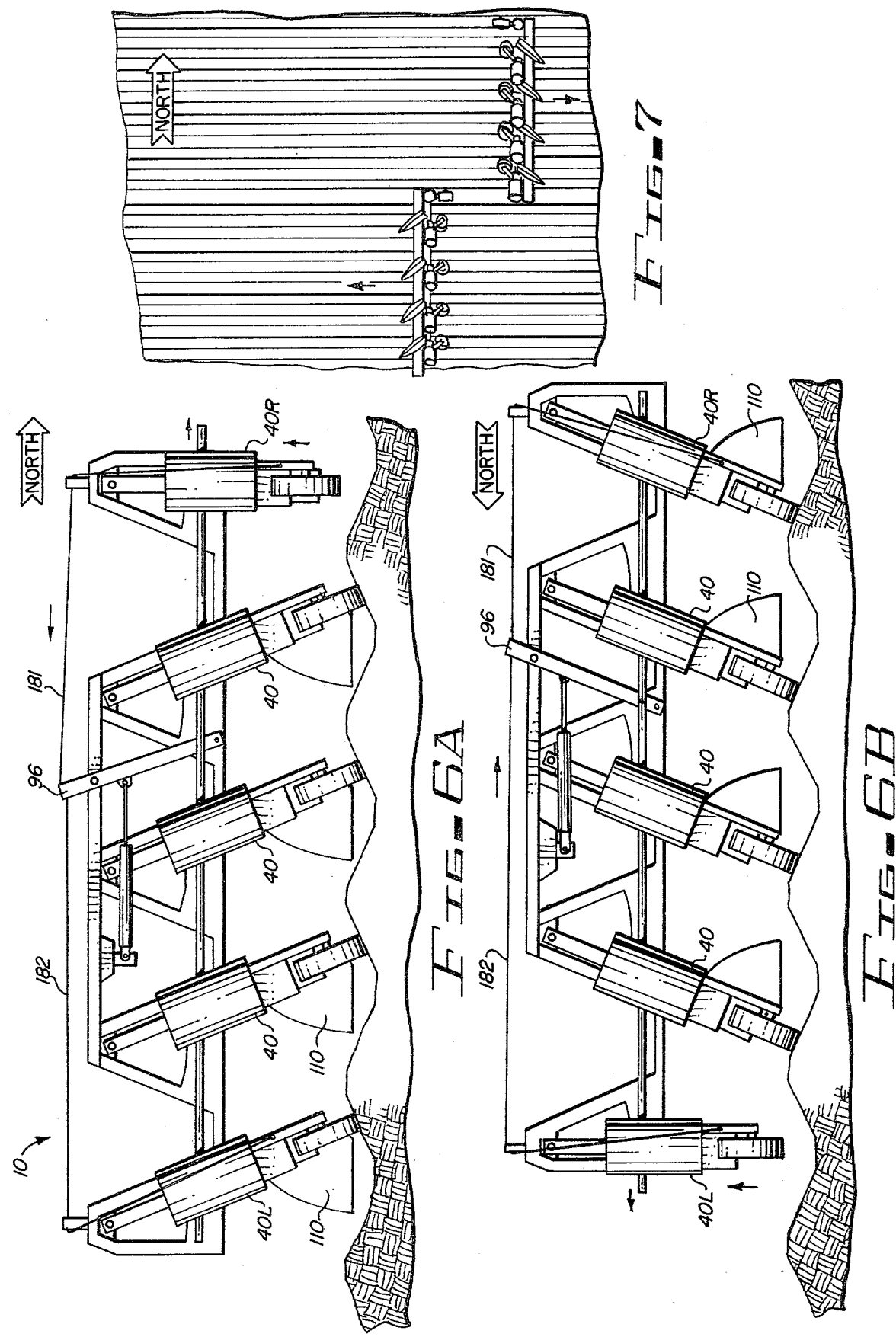

SIDE HILL BED SHAPER AND PLANTER

The present invention relates to a cotton planter, and more particularly relates to a cottonseed planter which simultaneously dresses the seed bed and plants the cottonseed on the side of the seed bed for increased production efficiency.

Tillage is performed for cotton production for a number of reasons, such as moving soil for seed insertion, modifying topography, to vary the bulk density of the soil. Tillage is also performed in the addition of soil amendments. Machinery required for tillage includes the power unit and proper tillage tools such as a plow. Other tillage devices include listers, subsoilers, rotary tillers and the like. The specific type of operations depend on a number of considerations, including the geographical area, type of soil.

Normally, a field is first plowed and after plowing, the loose soil is run over by the tractor pulling a harrow or other clod-breaking device. After plowing, harrowing and leveling operations are performed. Generally, a finely prepared seed bed is created for the seed. The purpose of the seed bed is to provide an optimum environment for germination, emergence and growth of the plant. To obtain the desired conditions, the shape of the seed beds prior to and after planting varies in different cotton producing areas depending on soil and climatic conditions. Generally in irrigated areas of the West, the proper seed environment is obtained on raised or listed beds. Row spacings and plant spacings vary, a primary consideration being availability of irrigation. Seed is placed in the seed bed by the cotton planter.

The cotton planter is generally composed of three basic components. These include the seeding mechanism, furrow opener, and a covering device. The seeding mechanism often uses some type of seed-metering device which places the seed in the seed bed in a furrow that has been opened. The covering device may be a chisel, disk or drag which follows the seed-metering device. In some areas, devices known as press wheels are used in planting cotton and they are designed to accomplish functions of firming the soil and smoothing the surface.

It has been found that superior results are often obtained in some geographic areas, particularly the West and Southwest, if the cottonseed is planted on the south side of the seed bed. Planting on the south side of the seed bed enables the farmer to plant earlier in the season; therefore, obtaining greater yields. South-side planting also affords protection for the plant during early germination and emergence stages. Further, in these geographical areas where irrigation is often practiced, salt tends to percolate or form into a peak of the bed. Planting the cottonseed on the side of the bed removed from the center of the seed bed tends to remove the plant, particularly in the early fragile stages, from the salt influenced area. Various types of cotton tillage and planting devices can be found in the prior art; however, none are particularly adapted for planting cotton on the south side of the seed bed as discussed above. Therefore, it appears there exists a substantial need in the cotton agricultural industry for a device which satisfactorily dresses seed beds and accomplishes planting on the side of the seed bed.

Briefly, the present invention comprises a skid-mounted tool bar assembly adapted to be towed in a two-way operation by a two- or three-point hitch bar by a tractor. A plurality of seeder assemblies including following press wheels are mounted at spaced-apart locations along the tool bar frame. The seeder assemblies are each secured to a pivot assembly secured to the tool bar. The pivot assembly allows the seed cans to be tilted from the vertical position to seed along the south side of the furrows. A shaping or dressing blade precedes the seeder assemblies to smooth and dress the furrows. A transverse control arm is operably connected to each of the pivot assemblies and to a linkage controlling the position of the dressing blades. When the operator reaches the end of a row and turns around, the linkage is thrown to tilt the seeder assemblies to the opposite inclination. The shaping blades are swung about a vertical axis to a new position to dress the furrows as the planter is driven back through the field.

The above and objects and advantages of the present invention will become more apparent from the following description, claims and drawings in which:

FIG. 1 is a perspective view illustrating the cotton planter of the present invention;

FIG. 2 is a plane view illustrating a portion of the shaping blade showing the two positions of the blade;

FIG. 3 is an elevational view of one of the shaping blades;

FIG. 6A is a rear view of the cotton planter illustrating the planting operation as the planter proceeds through a field in a westerly direction;

FIG. 6B is a rear view of the cotton planter illustrating the seeding operation as the planter proceeds through the field in an easterly direction; and FIG. 7 is a plane view illustrating a cottonplanting operation showing the planter proceeding through the cotton field in both an easterly and westerly direction.

Figure 4:
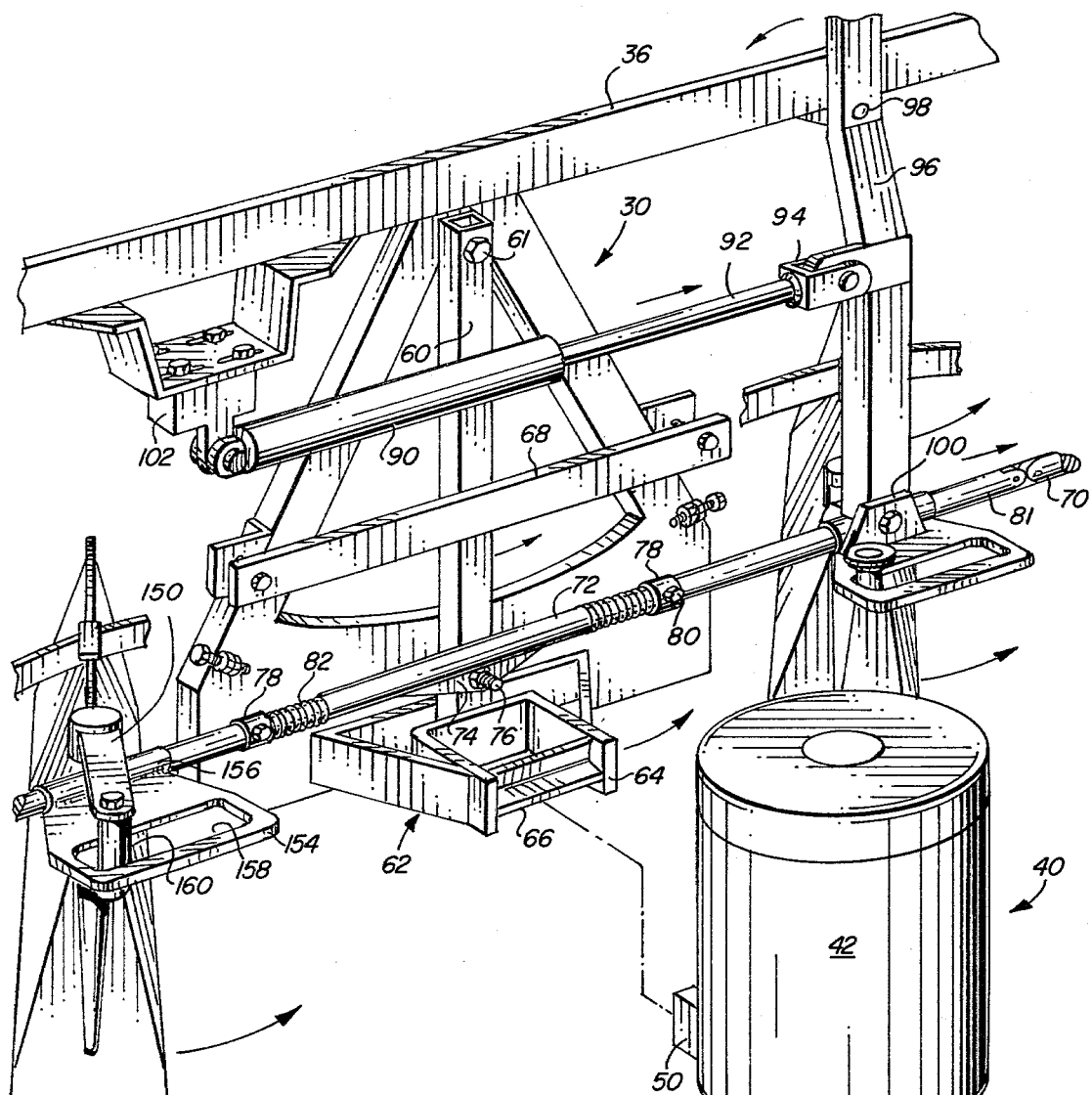
FIG. 4 is a rear perspective view illustrating one section of the cotton planter.

Generally, in irrigated areas such as the Western and Southwestern parts of the United States, cotton is planted in raised or listed beds. Planting cotton on the south, or the side of the bed which has the greatest exposure to the sun, has significant advantages. The present invention provides a planter which simultaneously shapes the seed bed and plants the cottonseed on the side of the seed bed. The cotton planter of the present invention is generally designated by the numeral 10 and includes a frame assembly having generally transverse tool bars 12 and 14 interconnected at spaced-apart locations by frame members 16 which define multiple planting sections 18.

Four planting sections 18 are shown for purposes of illustration. It will be apparent that the particular number of planting sections may be varied in accordance with the requirements which may be dictated by row spacing, custom and practice, and the size of the prime mover available to tow the planter 10. A tubular leg member 20 vertically depends from the tool bar at the intersection of the tool bars 12 and 14 with the cross-frame members 16. An additional support member 22 may extend between the tubular frame members 20 for structural reinforcement. A post 24 is slidably received in each of the tubular leg members 20. A series of spaced-apart apertures 25 may be provided in post 24 and adapted to register or align with bolt or pin 26 so the elevation of the cotton planter 10 can be adjusted as desired. A skid 28 having a turned-up tip portion 29 is secured to the lower end of each pair of posts 24. The planter is pulled through the field by a prime mover supported at the skids.

The cotton planter 10 is shown constructed of generally rectangular or tubular steel sections with the various frame components being either welded or bolted in place. It will be obvious that any convenient structural sections can be used and that other types of assembly can be used; for example, the entire unit could be of welded construction from tubular steel sections. A generally triangular A-frame member 30 is supported at each of the intermediate planter sections 18 at tool bar 12. Frame members 30 include a pair of legs 32 which converge to an apex. The legs 32 may be formed from any suitable structural section such as an angle iron. Frame members 34 are positioned on the tool bar 12 at the ends of the tool bar and are constructed having a generally vertical leg member 35 and an angular leg 37. Frame sections 30 are interconnected at their upper ends by transversely extending angle iron 36.

As best seen in FIG. 4, a plurality of seeder assemblies 40 are supported at the rear of the planter. The seeders 40 are more or less conventional and include a seed can on receptacle 42 for the containment of a preselected quantity of cottonseed. A seed metering device 44 dispenses the seed as the cotton planter moves through the field. The dispenser device may be in the form of a seed-metering plate which is driven mechanically from press wheel 46. A foldable linkage such as a parallelogram linkage 48 connects the press wheel 46 to the seed can 42. To disengage the planting mechanism, press wheel 46 may be vertically raised to a position out of contact with the ground. A clamp 50 is secured to the front of the seed can and is adapted to be secured to a mounting bracket on the cotton planter as will be more fully explained hereafter. The precise details of the seed can assembly, including the metering mechanism of the press wheel have not been set forth in detail as such assembly is well known in the cotton planting art. Typical assemblies of this type are seed can assemblies manufactured by John Deere Company. Five seeders 40 are shown in association with four planting section 18 as one seeder is inoperative depending on the direction of travel of one planter as will be more fully explained hereafter.

The angular position of the seeder 40 is controlled by a pivot assembly secured to each of the frame members 30 and 34. FIG. 4 illustrates the pivot assembly secured to one of the frame member 30 which is typical. Seeder positioning member includes arm 60 which is pivotally secured to the frame member 30 near the apex at pivot pin 61. Pivot arm 60 can be moved approximately 30 degrees either to the left or right of the vertical position as shown in FIG. 4. A bracket 62 is secured to the lower end of pivot arm 60. Bracket 62 includes a generally U-shaped member 64 which is welded or otherwise secured to the pivot arm 60. A bar 66 extends transversely between the legs of U-shaped member 64 and is adapted to receive clamp 50 of the seeder 40, as has been explained. Thus, the seeder assembly 40 will assume either a vertical or an angular or tilted position depending upon the position of the pivot arm 60. A guide plate 68 extends horizontally between the leg members 32 of frame member 30 to stabilize the movement of pivot arm 60. A similar arrangement secures seeders 40L and 40R to outboard frame members 34; however, seeders 40L and 40R are tiltable only one direction from the vertical position since one of these seeders is inoperative depending on direction of travel, which is accomplished by the positioning collar of 78 relative to sleeve 72.

The position of pivot arm 60 is determined by a transversely extending control rod 70. Control rod 70 extends through a cylindrical sleeve 72 which is pivotally secured near the lower end of pivot arm 60 at flange 74 by bolt 76. A pair of annular collars 78 are positioned on control rod 70 by set screws 80 at locations spaced apart from the end of sleeve 72. A compression spring 82 extends about the control rods 70 and is interposed between the ends of sleeve 72 and each of the collars 78. It will be obvious that when control rod 70 is moved to the left as viewed in FIG. 4, the right collar 78 will compress the adjacent spring 82 and further movement will urge sleeve 72 and pivot arm 60 leftwardly. As control rod 70 moves, sleeve 72 will pivot about mounting bolt 76 to accommodate further displacement of shaft 70. Compensation for the displacement of shaft 70 is provided by incorporating several hinge joints 81 at appropriate locations along control rod 70. It will be obvious that by moving control rod in the opposite direction, pivot arm 60 and attached seeder 40 will be angularly displaced in the opposite direction. The purpose of providing angular adjustment in both directions from vertical will permit the operator to plant on the selected side of the seed bed and to permit operation in opposite directions through the field as shown in FIGS. 6A, 6B and 7 as will be more fully explained hereafter.

The displacement of the control rod 70 may be accomplished manually or may be accomplished by hydraulic or pneumatic means. FIG. 4 illustrates a hydraulic actuator for displacing the control rod. Hydraulic actuator 90 includes a rod 92 having a clevis 94 secured to the outer end of the rod. Clevis 94 is pivotally connected to lever 96 which is secured to frame member 36 at pivot connection 98. The lower end of lever 96 is pivotally connected to bracket 100 which is secured to control rod 70. The head end of hydraulic cylinder 90 is secured to frame member 36 by bracket 102 which is adjustable relative to member 36 to vary the stroke of rod 90. It will be obvious that extension of rod 92 of hydraulic cylinder 90 will move lever 96 rightwardly, as viewed in FIG. 4, displacing the seed can to a position as shown in 6A. Retraction of hydraulic actuator 70 will oppositely tilt seed cans 40 to a position as shown in FIG. 6B. The other components of one hydraulic system, including the hydraulic control valves, have not been shown as such components and hydraulic systems are well known.

A shaping blade 110 is mounted in each of the sections 18 and precedes the seeder assembly 40. A description of one of the shaping blades 110 applies equally to all of the blades. Blade 110 is a two-way blade having opposite surfaces as 112 and 114, defining a generally rectangular cross-section. The forward end of the blade terminates at a nose section 116 which converges at leading edge 118. The tail of the dressing blade 110 is secured to a vertical shaft 120 at the approximate center of the section 18 so that in operation shaft 120 approximately aligns with the peak of the seed bed and intermediate two adjacent seeders. The relationship of the shaft and the blade is adapted so the blade assumes forwardly inclined position in operation as seen in FIG. 7. An arcuate guide member extends between tubular leg members 20 at each of the planter sections 18. A flange 126 is secured to the top edge of the blades 110. Flange 126 defines a slot which receives arcuate guide 124 to guide and stabilize the blade in its operative positions.

The operative positions of the blade are best shown in FIG. 2.

Figure 5:
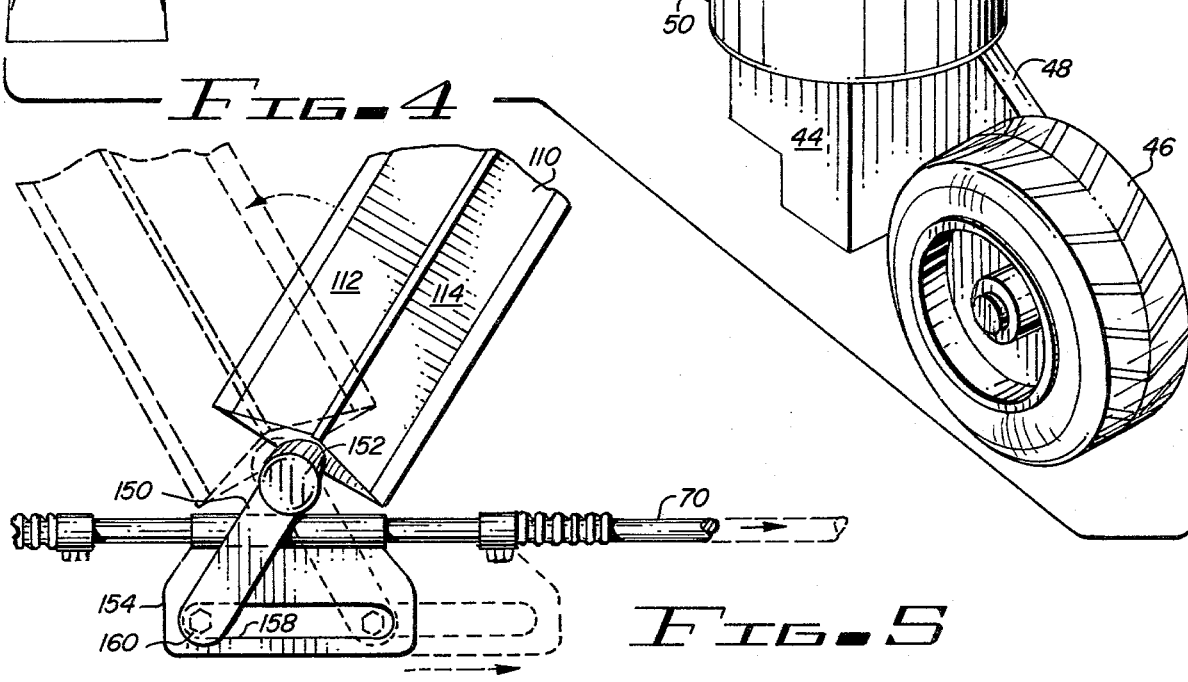
FIG. 5 is a plane view showing a portion of the shaping blade and associated control linkage.

The position of the furrow shaping blade 110 is changed by rotating mounting shaft 120. Lever 150 projects horizontally from the top end of shaft 120 at cap 152. Cam plate 154 is secured to control rod 70 at sleeve 156. Cam plate 154 defines a generally elongate cam slot 158. A cam follower, shown as a cylindrical roller 160, vertically depends near the outer end of lever 150 and is received within cam slot 158. As best seen in FIG. 5, actuation of the control rod 70 rightwardly will cause the shaping blade 110 to pivot to the position shown as dotted in FIG. 5. Note that the cam follower slot 158 allows some freedom of travel before actuation of blade 110 occurs. This is to permit compression of dampening spring 82 to occur so that tilting of the seeder 40 and shaping blade occurs simultaneously. The shaping blade in operative position is inclined slightly downwardly and displaced at an angle across the side of the seed bed on the side in which planting is to occur so that blade 110 serves to dress and shape the seed bed in advance of one of the proceeding seeders 40 adjacent the blade. Therefore, it is necessary that the number of seeders exceed the number of dressing blades by one because one of the outer seeders is always inoperative.

Generally the cotton planter in its present invention will be provided with an even number of sections 18. Referring to FIGS. 6A, 6B and 7, when the cotton planter is traversing a field westerly, the right-hand seeder 40R, as seen in FIG. 6A, is inoperative. The unit is a two-way unit when the operator makes a turn at the end of the field and returns progressing easterly, the units are again seeding on the southern side of the seed bed and the left-hand seeder 40L is inoperative. To disengage the seeder which is to be inoperative, a mast arm 170 projects horizontally from top end of the end frame assemblies 34. A pulley 175 is attached to the outer end of the mast 170. A cable 181 extends from the upper end of lever 96 through a bore 178 in the mast 170 around pulley 175 and is attached to the press wheel 46 of seeder 40L. Similarly, cable 182 connects lever 96 to the press wheel of seeder 40R. When lever 96 is pivoted leftwardly as in FIG. 6A, tension is applied through cable member 181 causing the press wheel 46 of seeder 40R to be lifted from the ground at linkage 48. Similarly, when lever 96 is moved rightwardly, as seen in FIG. 6B, tension is applied through cable 182 to raise seeder 40L. When the press wheel is disengaged from the ground, the seeder is not operative.

A brief description of operation of the planter of the present invention will assist in an understanding of the present invention. The cotton planter 10 of the present invention may be secured by a conventional two- or three-point hitch to a prime mover of any type such as a tractor. The field has first been prepared and listed or raised beds formed, as shown in FIGS. 6A and 6B which are indicated by the numerals 1 to 9. The seed cans 40 of the various seeders 40 are filled with cottonseed. The operator progresses through the field starting in a westerly direction as shown in FIG. 7. The lever 96 has been actuated rightwardly by hydraulic actuator 90, as shown in FIG. 6A, to move control bar 70 to the right. The rightward movement of control bar 70 will, in turn, move pivot arms 60 to the right which will tilt the intermediate seeders 40 and seeder 40L to the positions shown in FIG. 6A. This will allow the operator to seed on the south side of seed beds 1 through 4 as shown in FIG. 6A. The rightward displacement of the control bar 70 will also move cam plate 154 rightwardly, urging shaping blade 110 to position as shown in dotted in FIG. 5. The shaping blade 110 precedes the seeder and will dress the side of the seed bed prior to seeding. A seed-metering device will be properly calibrated for the desired seed rate depending on the variety of cotton and the operating speed of the apparatus. The seed is distributed at the proper rate and press wheel 46 compresses the soil around the seed to create a more positive contact between the planted seed and the surrounding soil.

When the operator reaches the west end of the field, the prime mover is turned about 180° and the operator proceeds through the field in an easterly direction. The hydraulic control is actuated to retract rod 92 of actuator 90. This retraction will move lever 96 leftwards as viewed in FIG. 6B. This action will reversely pivot the seeder assemblies 40. Seeder 40L will be returned to a vertical position and seeder 40R tilted to the right as seen in FIG. 6B. The position of the furrow shaping blades will be swung to a position to precede the four operative seeders. Because of the two-way operation, one seeder is inoperative and the shaping blades precede one of two adjacent seeders dependent upon direction of operation. The reverse movement of lever 96 places tension on cable 182 to cause the outermost seeder 40L to be raised to the disengaged position. Simultaneously, the opposite outside seeder 40R is allowed to drop to a position in contact with the ground. Shaping and seeding on one side of the seed bed will occur as the operator proceeds. The two-way seeding operation is continued until one field is completely seeded.

From the foregoing, it will be obvious that the present invention provides a unique approach to the planting of cotton and other crops where it is desired to place seed in a particular location on a seed bed. The planter of the present invention can be used with a wide variety of crops, but is particularly adapted for planting cotton in geographical locations where cotton is planted in raised or listed beds.

It will be obvious to those skilled in the art to make various changes, alterations and modifications to the cotton planter described herein. To the extent that these changes, modifications and alterations do not depart from the spirit and scope of the appended claims, they are intended to be encompassed therein.

I claim:
1. A planter for planting agricultural crops in two-way operation along one side of raised generally parallel seed beds comprising:
  (a) a frame including a tool bar supported on ground-engaging means for traversing a field along said seed beds;
  (b) mounting means on said frame having at least a first and second operating position;
  (c) multiple seeder means tiltably secured to said mounting means including a receptacle for seeds and dispensing means for dispensing the seeds at a preselected rate, said dispensing means being driven from ground engaging drive means;
  (d) shaping blade means pivotally mounted on said frame about a vertical pivot axis intermediate adjacent seeder means positioned to precede said seeder means, the number of shaping blade means being one less than the number of seeder means, said shaping blade means having at least a first and second position whereby a selected seed bed side can be shaped in either direction of operation along said seed bed;

(e) control means operatively connected to said seeder means and said shaping blade means whereby the operator can reverse direction of operation at one end of a seed bed and move said seeder means and said shaping blade means from said first to said second positions thereby permitting shaping and seeding along the selected side of the seed beds in the reverse direction of operation through the field; and (f) means for selectively disengaging either of the outermost seeder means dependent on the direction of travel and whereby upon a reversal of direction of travel the shaping blade means preceding the inoperative seeder means is moved to either of said positions to cooperate with the seeder means immediately adjacent the inoperative seeder means.

2. The planter of claim 1 wherein said control means comprises an elongate control rod operatively connected to a pivotal arm member mounting each seeder means and to each shaping blade.

3. The planter of claim 1 wherein said shaping blade includes a vertical pivotal shaft and a lever extending from said shaft operatively connected to move said shaping blade between said first and said second positions and further including cam means on said control means for actuating said lever in response to the operator.

4. The planter of claim 1 wherein said seeder means is a press-wheel type seeder.

5. The planter of claim 4 wherein said means for selectively disengaging at least one seeder means comprises means for moving said press wheel out-of-ground contact.

6. The planter of claim 1 wherein said frame is vertically adjustable with respect to the ground.

7. The planter of claim 1 further including hydraulic actuator means operatively connected to said control means for selectively operating the same.

* * * * *